United States Patent
Noma et al.

(10) Patent No.: US 6,490,056 B1
(45) Date of Patent: Dec. 3, 2002

(54) COMMUNICATION SPEED SWITCHING DEVICE

(75) Inventors: Nobuhiko Noma, Yokohama (JP); Keiji Egashira, Yokohama (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/182,451

(22) Filed: Oct. 30, 1998

(30) Foreign Application Priority Data

Mar. 13, 1998 (JP) .......................................... 10-082532

(51) Int. Cl.⁷ ............................................. H04M 1/100
(52) U.S. Cl. ...................... 358/405; 358/400; 358/438
(58) Field of Search ................................ 358/400, 438, 358/412, 434, 468, 435, 436, 405, 411, 420

(56) References Cited

U.S. PATENT DOCUMENTS

| | | | |
|---|---|---|---|
| 4,680,781 A | | 7/1987 | Amundson et al. ............. 375/8 |
| 4,736,249 A | | 4/1988 | Iizuka et al. ................. 358/257 |
| 4,868,864 A | * | 9/1989 | Tjahjadi et al. ............... 379/98 |
| 4,910,506 A | * | 3/1990 | Takehiro ...................... 340/825 |
| 5,146,472 A | | 9/1992 | Hallman ........................ 375/8 |
| 5,477,340 A | * | 12/1995 | Hasegawa .................... 358/438 |
| 5,995,239 A | * | 11/1999 | Kagawa ....................... 358/405 |

FOREIGN PATENT DOCUMENTS

| | | |
|---|---|---|
| JP | 57-24142 | 2/1982 |
| JP | 57-35450 | 2/1982 |
| JP | 58-39167 | 3/1983 |
| JP | 58117770 | 7/1983 |
| JP | 1-64442 | 3/1989 |
| JP | 5-37674 | 2/1993 |
| JP | 06209409 | * 7/1994 ............ H04N/1/32 |
| JP | 6-225101 | 8/1994 |
| JP | 8-293992 | 11/1996 |
| JP | 10-32704 | 2/1998 |
| JP | 10290351 | 10/1998 |

OTHER PUBLICATIONS

English Language Abstract of JP 57–35450.
English Language Abstract of JP 57–24142.
English Language Abstract of JP 6–225101.
English Language Abstract of JP 58–39167.
An English Language abstract of JP 58–117770.
An English Language abstract of JP 1–64442.

* cited by examiner

Primary Examiner—Jerome Grant, II
Assistant Examiner—Negussie Worku
(74) Attorney, Agent, or Firm—Greenblum & Bernstein, P.L.C.

(57) ABSTRACT

It is decided whether or not the reception is performed with respect to signals of 1650 Hz, 1750 Hz and 1850 Hz passed through band pass filter (BPF) 4031 up to 4033 and processed for the energy calculation in energy calculating circuit 4041 up to 4043 respectively. Low speed signals that are processed for the energy calculation in energy calculation circuit 4041 up to 4043 respectively are added in adding section 405. At this time, a timer in decision circuit 406 starts. When a predetermined time passes in the timer in decision circuit 406 with a predetermined energy level of signals of 1650 Hz, 1750 Hz and 1850 Hz kept, the signals are identified as EOP signal that comes after PIX signal. Thereby the apparatus is controlled to shift to the low speed signal reception mode.

5 Claims, 5 Drawing Sheets

COMMUNICATION SPEED SWITCHING DEVICE

BACKGROUND OF THE INVENTION

1. Field of the Invention

The present invention relates to a device for switching communication speed in a modem.

2. Description of the Related Art

In a facsimile protocol such as V.17 and V.29 in the recommendation T.30, a calling side first transmits DIS signal, DCS signal and so on at a low speed of 300 bps, next transmits TCF signal, an image signal PIX at a high speed, then transmits EOP signal again at a low speed.

In the latter half of the image signal PIX RTC signal is added. In the above recommendation, the RTC signal is intended to be detected in an answering side. When the answering side detects the RTC signal, the answering side shifts an apparatus mode from a high speed signal reception mode to a low speed signal reception mode, which enables the answering side to receive the EOP signal that is a low speed signal coming next.

However the RTC signal is hard to recognize because the generation time is short. And it sometimes occurs that the RTC signal can not be detected when a switching device is momentarily interrupted by impulse noise and so on, because the noise resistance of the RTC signal is low. In this case, the low speed is received at the high speed signal reception mode, which remains the problem that the low speed signals after the EOP signal can not be received.

SUMMARY OF THE INVENTION

It is an object of the present invention is to provide a communication speed switching device capable of shifting assuredly from a high speed signal reception mode to a low speed signal reception mode.

The object is achieved by a communication speed switching comprising a detecting section for detecting a first frequency used in a low speed reception mode, and a reception mode switching section for switching the mode to the low speed reception mode when the detecting section detects the first frequency for a predetermined interval.

DETAILED DESCRIPTION OF THE PREFERRED EMBODIMENTS

Figure 1:
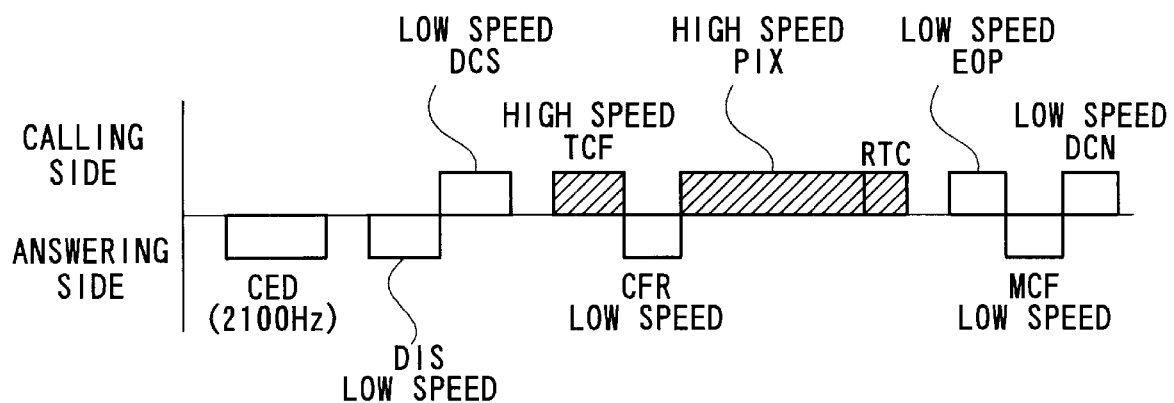
FIG. 1 is a sequence diagram illustrating a facsimile protocol in the recommendation T.30.

A communication speed switching device of the present invention comprises a detecting section for detecting a first frequency used in a low speed reception mode, and a reception mode switching section for switching the mode to the low speed reception mode when the detecting section detects the first frequency for a certain interval.

In the above constitution, it is possible to acquire the timing of switching a mode to a low speed signal reception mode by other signals except the RTC signal. That makes it possible to detect a signal coming after the RTC signal when the RTC signal can not be detected so as to achieve the reliable communication.

It is preferable that the communication speed switching device comprises a first deciding section to decide, when the detecting section detects a signal of a first frequency for a predetermined interval, that the detected signal is a low speed signal. In this manner, it is possible to recognize a low speed signal indicative of protocol end and so on, which enables the apparatus to shift to the low speed mode assuredly after at the time of the protocol end.

In the communication speed switching device, it is preferable that the first deciding section decides, when the first deciding section detects a signal of a second frequency used in a high speed reception mode, that the detected signal is not a low speed signal. In this manner, it is possible to recognize the mode is still in the high speed reception mode in spite of receiving a low speed signal, and continue receiving a high speed signal such as image signal. As a result, it is possible to prevent the change of the mode as receiving the image signal and so on.

In the above communication speed switching device, it is preferable that the detecting section decides that a signal of the first frequency is detected when the energy of the detected (first frequency) signal exceeds the predetermined level. In this case, it is preferable that the detecting section detects a signal of a frequency around the first frequency that has the energy exceeding the predetermined energy level.

In some signal patterns, the signal of the frequency around the first frequency has higher energy than the signal of the first frequency. By the constitution, even in such case, it is possible to recognize a low speed signal and shift to a low speed reception mode assuredly.

In the communication speed switching device of the present invention, it is preferable that the detecting section comprises a second deciding section for deciding whether or not the energy level of a demodulated signal is within a predetermined level. In this manner, it is possible to easily recognize a low speed signal by deciding whether or not the energy level is within the predetermined level, because, for instance, a low speed signal that is not QAM modulated indicates a certain energy level after QAM demodulated.

In the communication speed switching device, it is preferable that the second deciding section decides that a received demodulated signal is not a low speed signal when the energy level of the received demodulated signal is out of the predetermined level. In this manner, it is possible to recognize the mode is still in the high speed reception mode in spite of receiving a low speed signal, and continue receiving a high speed signal such as image signal. As a result, it is possible to prevent the change of the mode as receiving the image signal and so on. In the communication speed switching device, it is preferable that the predetermined level is indicated in a signal point arrangement diagram in the complex plane.

It is preferable that the communication speed switching device comprise a third deciding section for counting a signal of the first frequency and deciding that the signals are low speed signals when the predetermined number of the signals are counted. In this manner, it is possible to recognize a patterned instruction signal indicative of a low speed reception mode shift, which allows the response to various instruction signals for the low speed reception mode shift from a calling side. As a result, it is possible to perform the reliable shift to the low speed reception mode using the patterned signal.

Hereinafter, the embodiments of the present invention are explained in detail with reference to the attached drawings.

FIG. 1 is a sequence diagram to explain V.17 and V.29 facsimile protocols in T.30. In those protocols, as described above, DIS signal from an answering side and DCS signal from a calling side are communicated at a low communication speed, next TCF signal and PIX signal from the calling side are communicated at a high communication speed, then EOP signal and MCF signal are communicated at the low communication speed.

Figure 2:
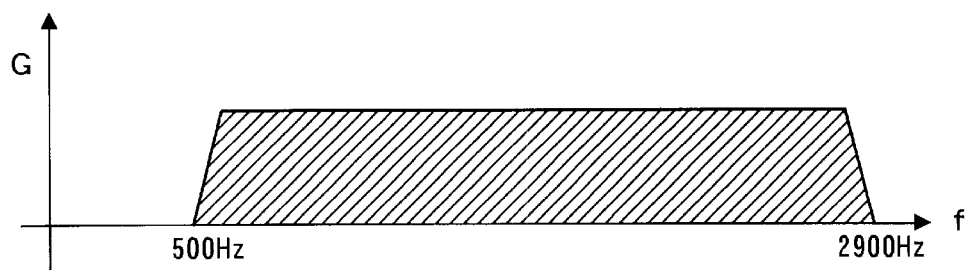
FIG. 2 is a diagram illustrating the spectrum of a high signal.
Figure 3:
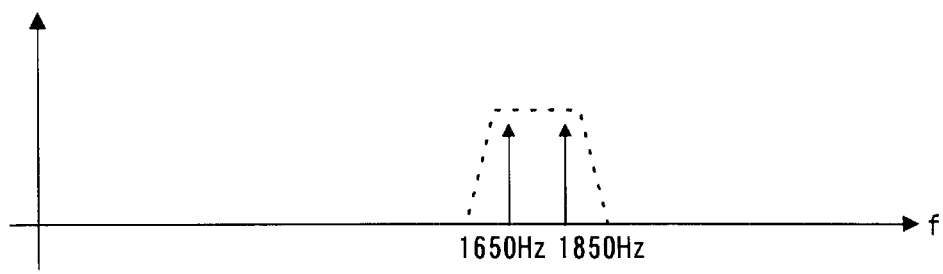
FIG. 3 is a diagram illustrating the spectrum of a low speed signal.

As described above, the above protocols include low speed signal communication and high speed signal communication. In the high speed signal communication, for instance, as illustrated in FIG. 2, signals of 500 Hz up to 2900 Hz are transmitted and received in accordance with V.29 recommendation. In the low speed signal communication, for instance, as illustrated in FIG. 3, two signals of 1650 Hz and 1850 Hz. In addition, each of the two signal indicates "0" and "1". In other words, signals in the high speed signal communication are composed of a plurality of signals at the band of 500 Hz up to 2900 Hz, and signals in the low speed signal communication are composed of only two signals of 1650 Hz and 1850 Hz.

In the present invention, low speed signals are detected utilizing the characteristics of those signals. In addition, in the present specification, the low speed signals to be recognized mean EOP signal, EOM signal and MPS signal in accordance with T.30 recommendation.

Hereinafter, the embodiments of the present invention are explained with reference to the attached drawings.

First Embodiment

In the embodiments of the present invention, an explanation is given to the case of switching a mode from a high speed reception mode to a low speed reception mode by recognizing the low speed signal when obtained a predetermined energy of at least one of signals at 1650 Hz, 1750 Hz and 1850 Hz which are signals in a low speed signal communication for a predetermined interval.

Figure 4:
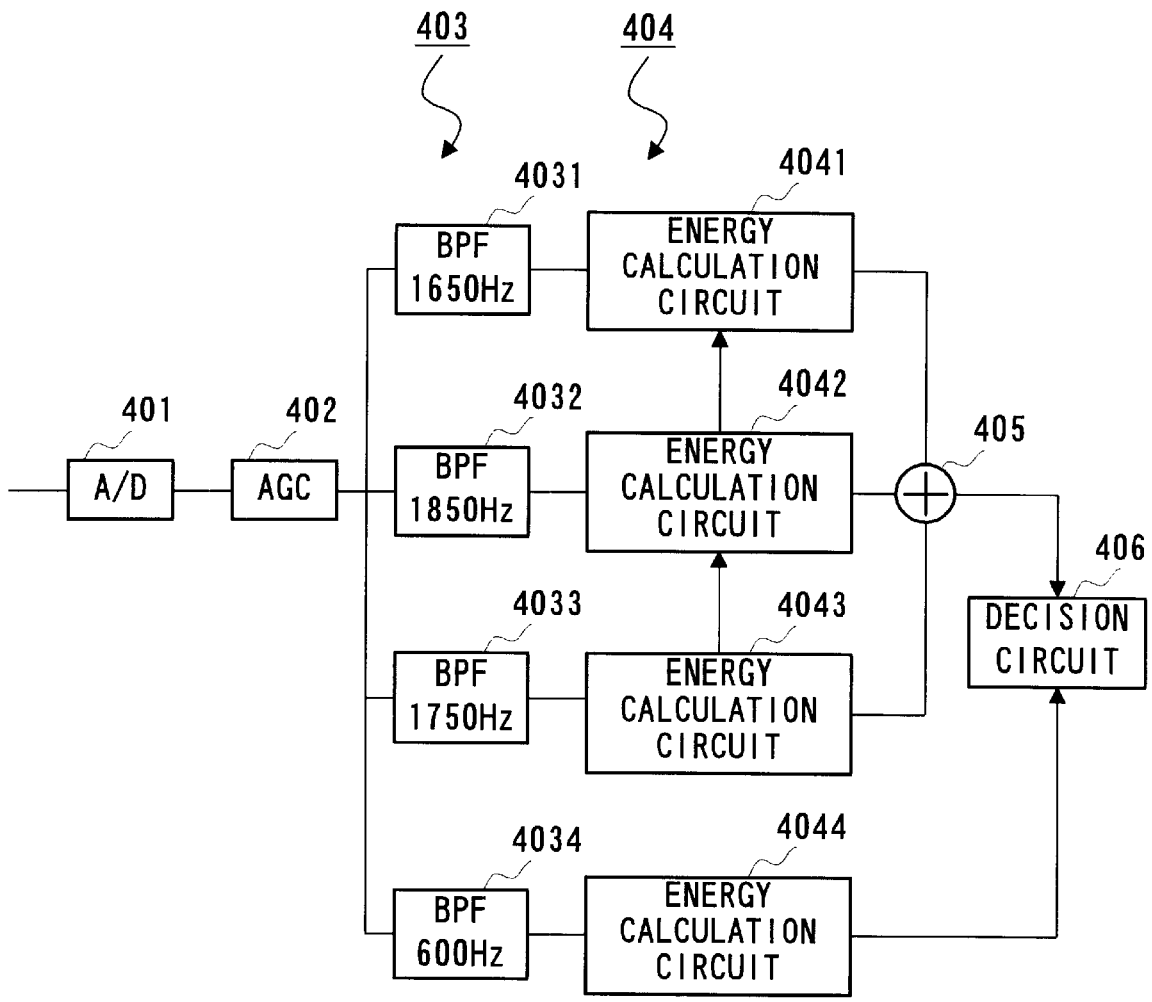
FIG. 4 is a block diagram illustrating a schematic configuration of a communication speed switching device in the first embodiment of the present invention.

FIG. 4 is a block diagram illustrating a schematic configuration of a communication speed switching device in the first embodiment of the present invention. The communication speed switching device is applied in a modem in a data communication apparatus, for instance, facsimile apparatus. The communication speed switching device comprises A/D converting section 401 for converting an analogue signal into a digital signal, AGC section 402 for performing the automatic gain control of the converted digital signal, band pass filter 403 for detecting each frequency, energy calculating circuit 404 for calculating energy of each frequency, adding section 405 for adding a signal of each frequency and decision circuit 406 for deciding each frequency.

Band pass filter 403 includes filter 4031 for a signal of the frequency at 1650 Hz, filter 4032 for a signal of the frequency at 1850 Hz, filter 4033 for a signal of the frequency at 1750 Hz, which frequencies are used in a low speed signal communication, and filter 4034 for a signal of the frequency at 600 Hz used in a high speed signal communication.

And energy calculating circuit 404 includes calculation circuit 4041 a signal of the frequency at 1650 Hz, calculation circuit 4042 for a signal of the frequency at 1850 Hz, filter 4043 for a signal of the frequency at 1750 Hz, and calculation circuit 4044 for a signal of the frequency at 600 Hz each corresponding to filters 4031 up to 4034 respectively.

And decision circuit 406 comprises a timer (not shown) for counting a time receiving a signal of a frequency used in a low speed signal communication.

Figure 5:
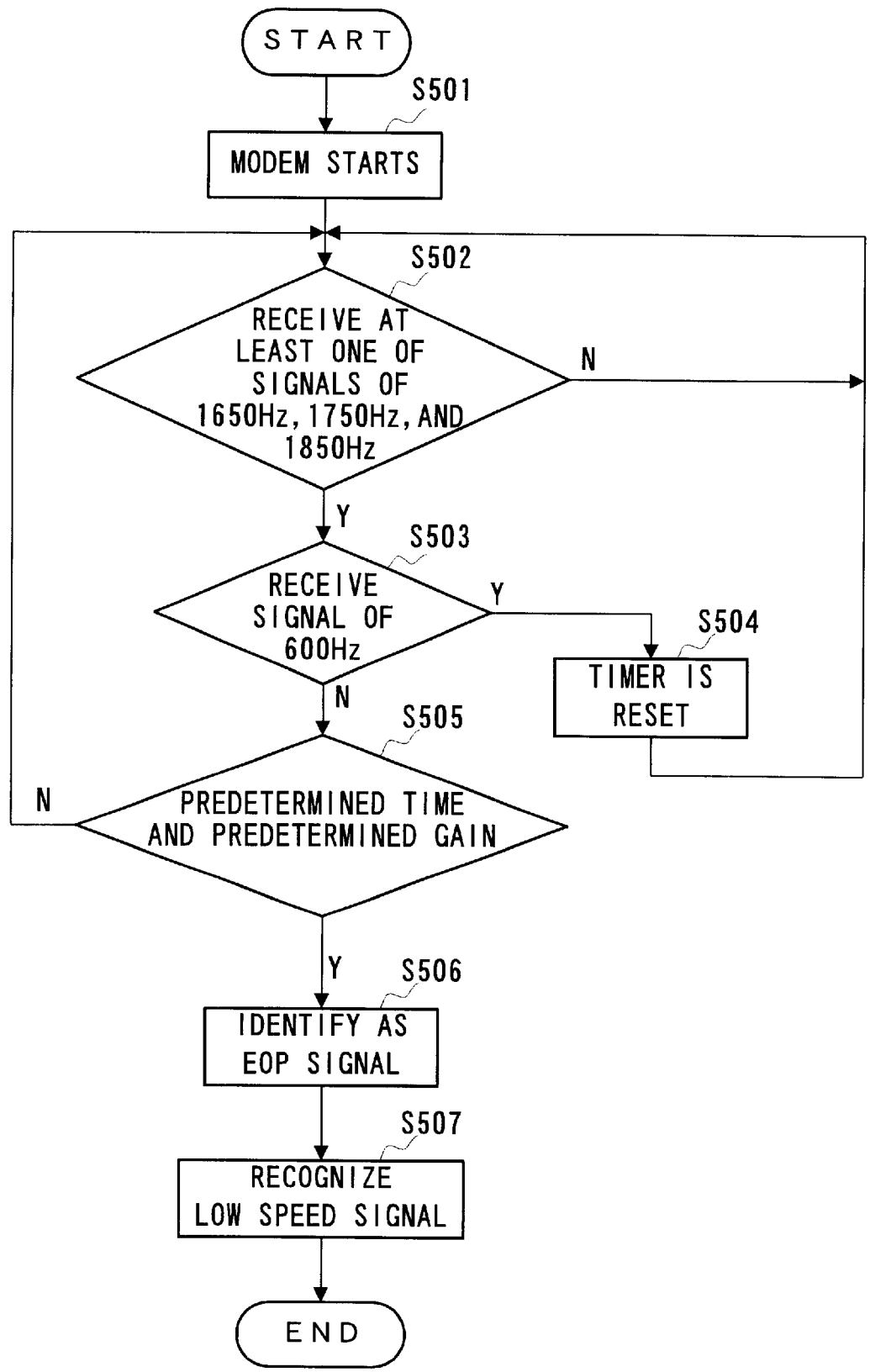
FIG. 5 is a flow chart illustrating an operation of the communication speed switching device in the above embodiment.

Next the communication speed switching device with the above configuration is explained using a flow chart illustrated in FIG. 5. In step (hereinafter abbreviated as S) 501, a modem starts up and a facsimile communication starts. In S502, it is decided whether or not the reception is performed with respect to at least one of a signal of 1650 Hz passed through band pass filter (BPF) 4031 and processed for the energy calculation in calculation circuit 4041, a signal of 1750 Hz passed through band pass filter (BPF) 4032 and processed for the energy calculation in calculation circuit 4042, and a signal of 1850 Hz passed through band pass filter (BPF) 4033 and processed for the energy calculation in calculation circuit 4043. In other words, either is preferable to examine the reception of each signal of 1650 Hz, 1750 Hz or 1850 Hz or to examine the reception of added signals of 1650 Hz, 1750 Hz and 1850 Hz.

In this embodiment, it is intended that a signal of 1750 Hz is detected along with signals of 1650 Hz and 1850 Hz that are used in the low speed reception mode. It is because that a signal of 1750 Hz generated higher than a signal of 1650 Hz or a signal of 1750 Hz when a bit pattern of "0101" of V.21 signal at 300 bps that is the low speed is transmitted. Therefore by detecting the signal of 1750 Hz, in other words, detecting a signal of a frequency around 1650 Hz or 1850 Hz along with signals of 1650 Hz and 1850 Hz, it is possible to perform the reliable detection of the low speed signal assuredly. Accordingly, in such case, it is possible to switch a mode to the low speed reception mode assuredly.

Each low speed signal processed for the energy calculation in each of energy calculation circuit 4041 up to 4043 is added in adding section 405. At this time, a timer starts in decision circuit 406.

On the other hand, it is decided in S503 whether or not the reception is performed with respect to a signal of 600 Hz (second frequency) that passes through band pass filter 4034 and has the predetermined energy calculated in energy calculation circuit 4044. Since a signal of 600 Hz is a signal used in a high speed reception mode, specifically which is included in signals of 500 Hz up to 2900 Hz generated in a high speed image signal mode in accordance with V.29 and comes during high speed signals are continued, it is decided that the high speed reception is continued when the signal is received. In other words, it is decided that the signal is not EOP signal that comes after PIX signal. In this case, in S504, the timer in decision circuit 406 is reset. And the above operation is repeated.

In this manner, it is possible to recognize that the high speed reception mode is continued however low speed signals are received, which makes it possible to continue receiving high speed signals such as image signals. That can prevent the change of the reception mode during receiving, for instance image signals.

Next in S505 up to S507, when the timer in decision circuit 406 obtains a predetermined time and the energy level of signals of 1650 Hz, 1750 Hz and 1850 Hz reaches a predetermined gain level, it is decided in decision circuit 406 that signals of 1650 Hz, 1750 Hz and 1850 Hz that are low speed signals are detected, and recognized that the signals are EOP signals that come after PIX signal. In this manner, the modem detects the low speed signals. Accordingly, a facsimile apparatus controls the shift to a low speed signal reception mode based on the indication that the modem detects the low speed signals.

Thus, by always detecting a signal of 1650 Hz and a signal of 1850 Hz after the modem starts up, it is possible to recognize the low speed signals. That allows the detection of the low speed signals, the reliable switching to the low speed reception mode and the reliable communication in the case of not detecting a signal indicative of instruction of switching from high speed signal to low speed signal such as RTC signal.

In addition, in this embodiment, the case is explained where EOP signal is recognized when the signal energy level at a predetermined interval exceeds a predetermined level. However, it is preferable to control the shift from the high speed reception mode to the low speed reception mode by deciding EOP signal when "01111110" (7E) is recognized. "0" is counted when a signal of 1850 Hz is detected for 3.33 msec, and "1" is counted when a signal of 1650 Hz is detected for 3.33 msec. "01111110" is recognized by counting first "0", next six of "1" and further "0".

That is, in this embodiment, it is possible to recognize a patterned instruction signal indicative of the low speed reception mode shift, which allows the response to various instruction signals for the low speed reception mode shift from a calling side. Thus it is possible to perform the shift to the low speed reception mode assuredly using a patterned signal.

Second Embodiment

In this embodiment, the attention is paid to that a transmitted low speed signal that is not processed for QAM (Quadrature Amplitude Modulation) modulation indicates a certain energy when processed for QAM demodulation. An explanation is given to the case of recognizing EOP signal when the QAM demodulated signal indicates a certain energy level, then switching from a high speed reception mode to a low speed reception mode.

In this embodiment, specifically, a signal point arrangement diagram in the complex plane when low speed signals are received in the high speed signal reception mode is recognized to utilize. Hereinafter, the principle is explained.

Figure 6:
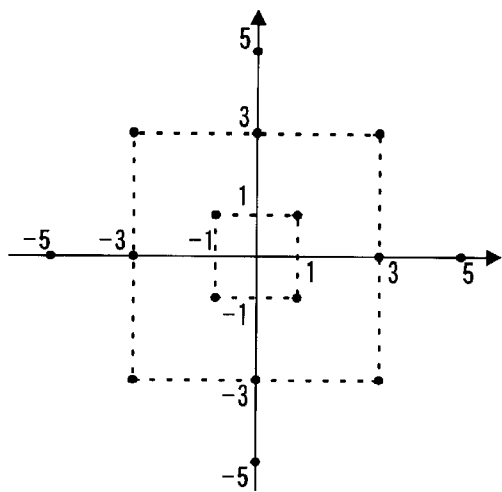
FIG. 6 is a diagram illustrating a signal point arrangement on the complex plane.
Figure 7:
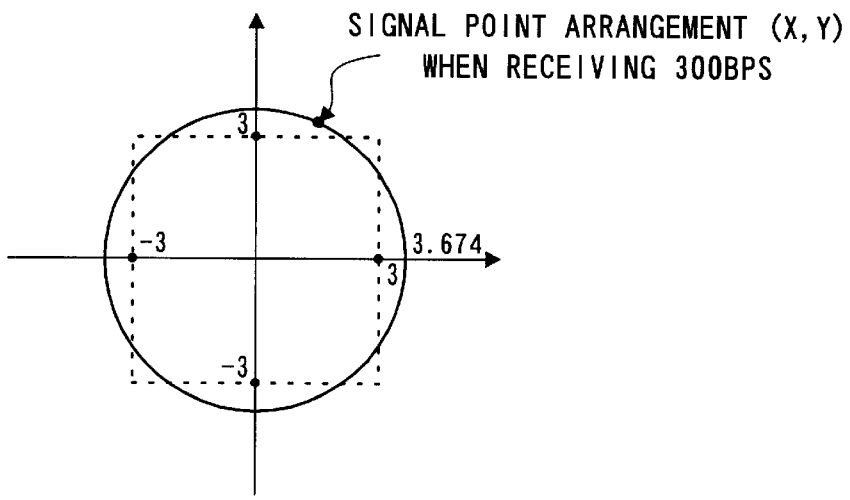
FIG. 7 is a diagram illustrating a signal point arrangement on the complex plane in the above embodiment.

FIG. 6 illustrated a signal point arrangement diagram (pattern) when receiving signals of 9600 bps, and FIG. 7 illustrated a signal point arrangement diagram (pattern) when receiving signals of 300 bps, in accordance with V.29 recommendation. Ordinary, a high speed signal is QAM modulated, and is demodulated at an answering side by QAM demodulation.

When it is assumed that a single frequency signal is cos $\omega t$ ($\omega$:1650 Hz or 1850 Hz), a carrier frequency for QAM demodulation is )$\omega 0$rad/f (1700 Hz in V.29), a real side (R) of a QAM demodulated single frequency signal is expressed as below.

$$R=\cos\omega t \cdot \cos\omega 0\ t=(\cos(\omega+\omega 0)t+\cos(\omega-\omega)t)/2$$

Eliminating $\cos(\omega+\omega 0)$ t that is a high frequency side introduces cos $(\omega-\omega 0)$t /2. On the other hand, an imaginary side (I) of the signal is expressed as below.

$$I=\cos\omega t \cdot \sin\omega 0 t=(\sin(\omega+\omega 0)t-\sin(\omega-\omega 0)t)/2$$

Eliminating $\sin(\omega+\omega 0)$ t that is a high frequency side introduces $-\sin(\omega-\omega 0)$ t /2.

The square of a length from the original point in pattern is expressed as below.

$$R2+I2=\cos 2(\omega-\omega 0)t/4+\sin 2(\omega-\omega 0)t/4=1/4$$

It is understood that the above equation indicates a certain value not depending on the frequency.

Accordingly, when signals that are not processed for QAM modulation have a certain energy after they are QAM demodulated and make a circle in the eye pattern as illustrated in FIG. 7. Thus, the eye pattern is used to recognize receiving a low speed signal that is not processed for QAM modulation. This principle is used to detect a low speed signal.

Figure 8:
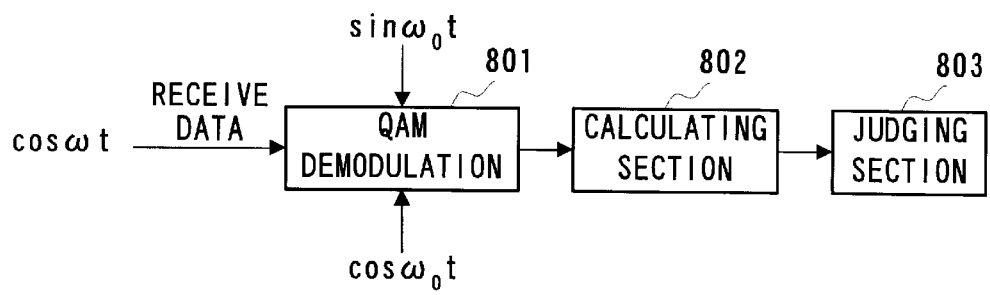
FIG. 8 is a block diagram illustrating a schematic configuration of a communication speed switching device in the second embodiment of the present invention.

FIG. 8 is a block diagram illustrating a schematic configuration of a communication speed switching device in the second embodiment of the present invention. The communication speed switching device comprises QAM demodulation section 801 for inputting sin $\omega t$ and cos $\omega t$ for QAM demodulation to multiply by input data, calculating section for calculating a scale of gain of the eye pattern of the QAM demodulated data, and deciding section 803 for deciding a calculation result in calculating section 802.

Figure 9:
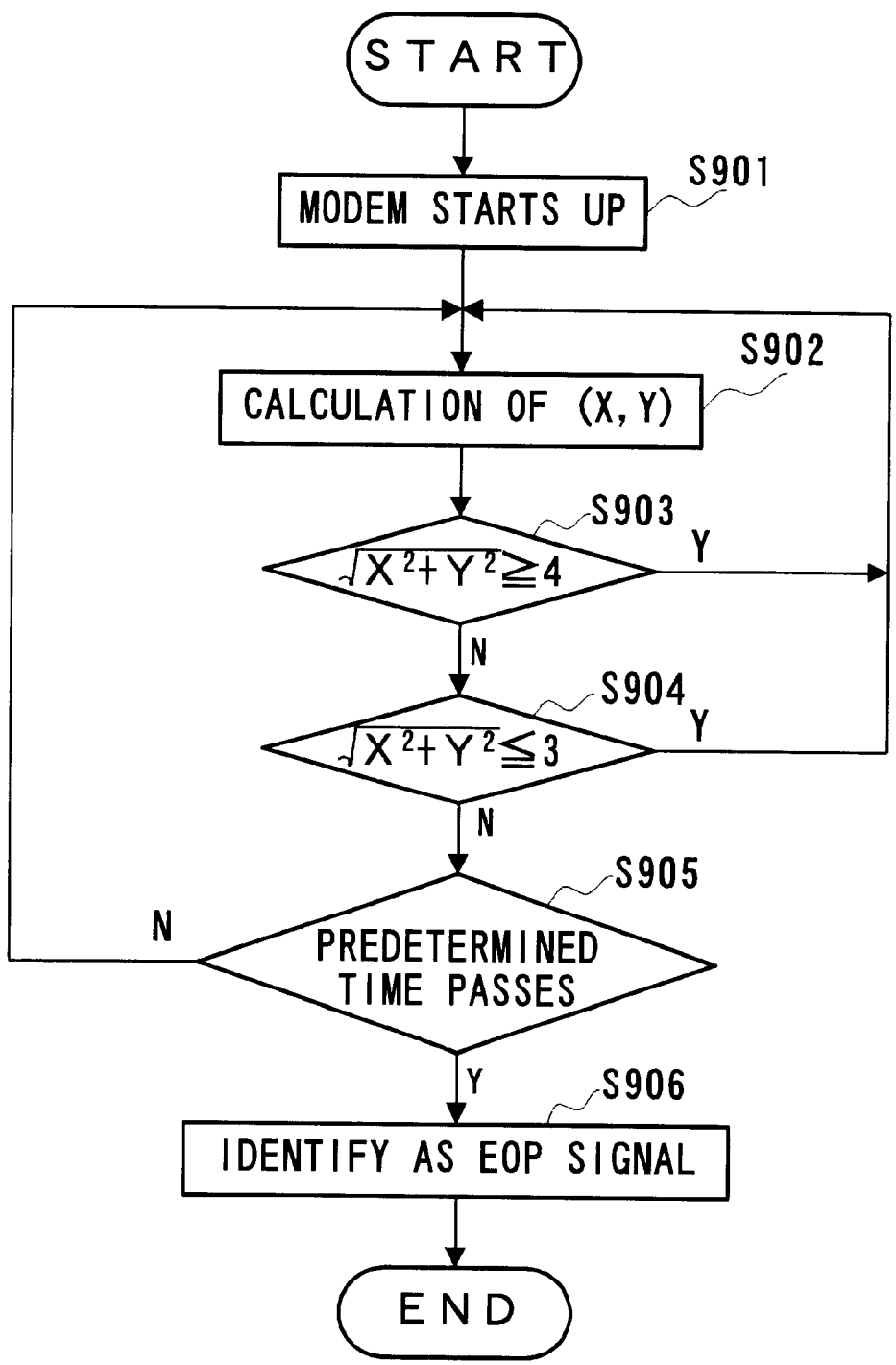
FIG. 9 is a flow chart illustrating an operation of the communication speed switching device.

FIG. 9 is a flow chart to explain an operation in a communication speed switching device configured described above. A modem starts up in S901, and (X,Y) in the complex plane is always detected in S902. It is decided whether or not a value of $\sqrt{(X^2+Y^2)}$ is not less than 4($\sqrt{(X^2+Y^2)} \geq 4$) in S903, and it is decided whether or not the value of $\sqrt{(X^2+Y^2)}$ is more than 3 ($\sqrt{(X^2+Y^2)} \leq 3$) in S904. These decisions are to examine whether or not the value indicates a predetermined energy level in the signal point arrangement diagram. Accordingly, when the energy level of a low speed signal that is not QAM modulated indicates, for instance, 3.674 after the signal is QAM demodulated, NO is decided both in S903 and S904.

And in S905 and S906, when this state in the eye pattern lasts for a predetermined interval, the signals are identified as EOP signal. Then the mode is shifted from a high speed reception mode to a low speed reception mode.

Thus, when low speed signals are received in the high speed reception mode, since the energy level in the detected eye pattern indicates a predetermined level, it is easy to identify low speed signals. It is thereby possible to recognize the detection of low speed signals, which allows the reliable communication.

In addition, in this embodiment in the same way as the first embodiment, by deciding that a demodulated signal is not EOP signal when the energy level of the demodulated signal is out of the predetermined range, it is possible to continue receiving high speed signals such as image signals. That prevents the change of the reception mode while receiving image signals and so on.

In the above embodiment, the explanation is given to the case where it is assumed that RTC signal, which is installed in the latter half of PIX signal, is not received. However, the present invention is not limited by the above case, and is applicable to any case of switching a high speed signal to a low speed signal. And in the present invention, it is preferable to change frequencies or a predetermined level properly to practice, not being limited by the numbers or values in the embodiments.

In the above embodiments, the explanation is given to the case where a low speed signal to identify is EOP signal. However, the present invention is applicable to the case where the low speed signal is EOM signal or MPS signal in the same way.

In the above embodiments, the explanation is given to the case where the communication speed switching device is applied to a facsimile apparatus. However, the communication speed switching device of the present invention is applicable to other data transmission apparatus.

As described above, in the communication speed switching device of the present invention, by recognizing a specific pattern of a signal point arrangement obtained when detected first appearing signals of a specific frequency as a low speed signal (EOP signal) or detected low speed signals, it is recognize the timing of switching high speed signals to low speed signals. Thereby it is possible to perform a reliable communication by shifting a mode from a high speed signal reception mode to a low speed signal reception mode.

What is claimed is:

1. A facsimile apparatus, the facsimile apparatus receiving an EOP signal and switching from a high speed reception mode to a low speed reception mode after receiving image data, the facsimile apparatus comprising:

a receiver that receives the image data in the high speed reception mode, and switches to the low speed reception mode after receiving the image data;

a detector that detects a signal having a first frequency and counts a detection period of the first frequency signal, in order to determine whether the EOP signal is received;

a timer reset system that, when a signal having a second frequency is received during the detection period of the first frequency signal, resets counting of the detection period; and a reception mode switching system that, when the detector counts a predetermined period, recognizes that the first frequency signal is the EOP signal, and switches said receiver from the high speed reception mode to the low speed reception mode, during reception of the EOP signal independently of a transmission speed of a source of the image data.

2. The facsimile apparatus according to claim 1, wherein the first frequency includes at least 1650 Hz, 1750 Hz and 1850 Hz signals.

3. The facsimile apparatus according to claim 1, wherein the second frequency includes at least a 600 Hz signal.

4. A communication speed switching device, the communication speed switching device receiving an EOP signal and switching from a high speed reception mode to a low speed reception mode after receiving image data, the device comprising:

a receiver that receives the image data in the high speed reception mode, and switches to the low speed reception mode after receiving the image data;

a detector that detects a signal having a first frequency and counts a detection period of the first frequency signal, in order to determine whether the EOP signal is received;

a timer reset system that, when a signal having a second frequency is received during the detection period of the first frequency signal, resets counting of the detection period; and a reception mode switching system that, when the detector counts a predetermined period, recognizes that the first frequency signal is the EOP signal, and switches said receiver from the high speed reception mode to the low speed reception mode, during reception of the EOP signal independently of a data transmission speed of a source of the image data.

5. A communication method for a facsimile apparatus, the facsimile apparatus receiving an EOP signal and switching from a high speed reception mode to a low speed reception mode after receiving image data, the method comprising:

receiving image data in the high speed reception mode, and switching to the low speed reception mode after receiving the image data;

detecting a signal having a first frequency;

counting a detection period of the first frequency signal;

resetting counting of the detection period, when a signal having a second frequency is received during the detection period of the first frequency signal; and recognizing that the first frequency signal is the EOP signal when the detector counts a predetermined period; and switching from the high speed reception mode to the low speed reception mode during reception of the EOP signal independently of a data transmission speed of a source of the image data.

* * * * *